(12) United States Patent
Fiorese et al.

(10) Patent No.: US 11,378,105 B2
(45) Date of Patent: Jul. 5, 2022

(54) GAS CYLINDER ACTUATOR WITH SAFETY DEVICE FOR UNCONTROLLED RETURN OF THE PISTON-STEM

(71) Applicant: SPECIAL SPRINGS S.R.L., Romano d'Ezzelino (IT)

(72) Inventors: Massimo Fiorese, Bassano del Grappa (IT); Daniel Fantinato, Bassano del Grappa (IT); Francesco Bordin, Caerano di San Marco (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 82 days.

(21) Appl. No.: 15/897,349

(22) Filed: Feb. 15, 2018

(65) Prior Publication Data

US 2018/0238357 A1    Aug. 23, 2018

(30) Foreign Application Priority Data

Feb. 17, 2017   (IT) .......................... 102017000018002
May 12, 2017   (IT) .......................... 102017000051549

(51) Int. Cl.
| | | |
|---|---|---|
| *F16F 9/02* | (2006.01) | |
| *F15B 15/22* | (2006.01) | |
| *F15B 15/14* | (2006.01) | |

(52) U.S. Cl.
CPC .......... *F15B 15/22* (2013.01); *F15B 15/1471* (2013.01); *F16F 2230/24* (2013.01)

(58) Field of Classification Search
CPC ............................. F16F 9/585; F16F 2230/24
See application file for complete search history.

(56) References Cited

U.S. PATENT DOCUMENTS 5,303,906 A * 4/1994 Cotter .................. F16F 9/0227
                                                          267/64.11
6,086,059 A * 7/2000 Runesson ............... F16F 7/123
                                                          188/300

(Continued)

FOREIGN PATENT DOCUMENTS

| CN | 1053884 A | 8/1991 |
|---|---|---|
| CN | 1946951 A | 4/2007 |

(Continued)

OTHER PUBLICATIONS

WO 2006105812 machine translation to English from espacenet. 2006.*

(Continued)

*Primary Examiner* — F Daniel Lopez
*Assistant Examiner* — Michael Quandt
(74) *Attorney, Agent, or Firm* — Scully, Scott, Murphy & Presser, P.C.

(57) ABSTRACT

A gas cylinder actuator with safety device for uncontrolled return of the piston-stem, comprising:
  a tubular containment jacket,
  two opposing heads for closing the tubular jacket, a first head which is provided with a through hole for passage and for translation guidance with respect to an axis of symmetry for a piston-stem, and a second, opposing head,
  a piston-stem, which comprises a stem portion and a piston portion,
  sealing elements which are arranged so as to act against the stem portion at the passage and guidance hole,
  a chamber for pressurized gas being defined between the tubular jacket, the heads and the piston-stem;
  such gas cylinder actuator comprises, between the first head and the piston portion, a bushing, which is coupled to the tubular jacket with elements of prevent- (Continued)

ing translation with respect to the axis, and is designed to encounter the piston portion, the bushing being configured to at least be deformed in the event of impact with the piston portion owing to the uncontrolled return of the piston-stem, so as to allow the passage of the piston portion and the formation of a gas discharge passage between the piston-stem, the sealing elements and the passage and guidance hole.

13 Claims, 8 Drawing Sheets

(56) References Cited

U.S. PATENT DOCUMENTS

| | | | | |
|---|---|---|---|---|
| 6,889,597 | B2 * | 5/2005 | Reiser | F16F 9/3242 267/64.28 |
| 9,046,146 | B2 * | 6/2015 | Cotter | F16F 9/48 |
| 9,157,500 | B2 * | 10/2015 | Cappeller | B21D 24/02 |
| 2016/0178055 | A1 | 6/2016 | Cappeller et al. | |

FOREIGN PATENT DOCUMENTS

| | | | | |
|---|---|---|---|---|
| CN | 103291684 | A | | 9/2013 |
| EP | 1329644 | A2 | | 7/2003 |
| EP | 2662589 | A1 | | 11/2013 |
| EP | 3072676 | A1 | | 9/2016 |
| JP | H06-050373 | A | | 2/1994 |
| JP | 2012-524875 | A | | 10/2012 |
| WO | WO 99/41520 | A1 | | 8/1999 |
| WO | WO-2006105812 | A1 * | 10/2006 | ............ F16F 9/0209 |
| WO | 2016/181059 | A1 | | 11/2016 |

OTHER PUBLICATIONS

Italian Search Report and Written Opinion dated Dec. 18, 2017 issued in IT 201700018002, with partial translation.
Chinese Office Action dated Aug. 27, 2020 received in Chinese Application No. 201810152002.0.
Indian Examination Report dated Apr. 9, 2021 received in Indian Application No. 201834004220, together with an English-language translation.
English-language translation of Chinese Office Action dated Apr. 14, 2021 received in Chinese Application No. 201810152002.0.
Japanese Notice of Reasons for Refusal dated Sep. 29, 2021 received in Japanese Patent Application No. 2018-025958, together with an English-language translation.
Japanese Notice of Reasons for Refusal dated Mar. 23, 2022 received in Japanese Patent Application No. 2018-025958, together with an English-language translation.

* cited by examiner

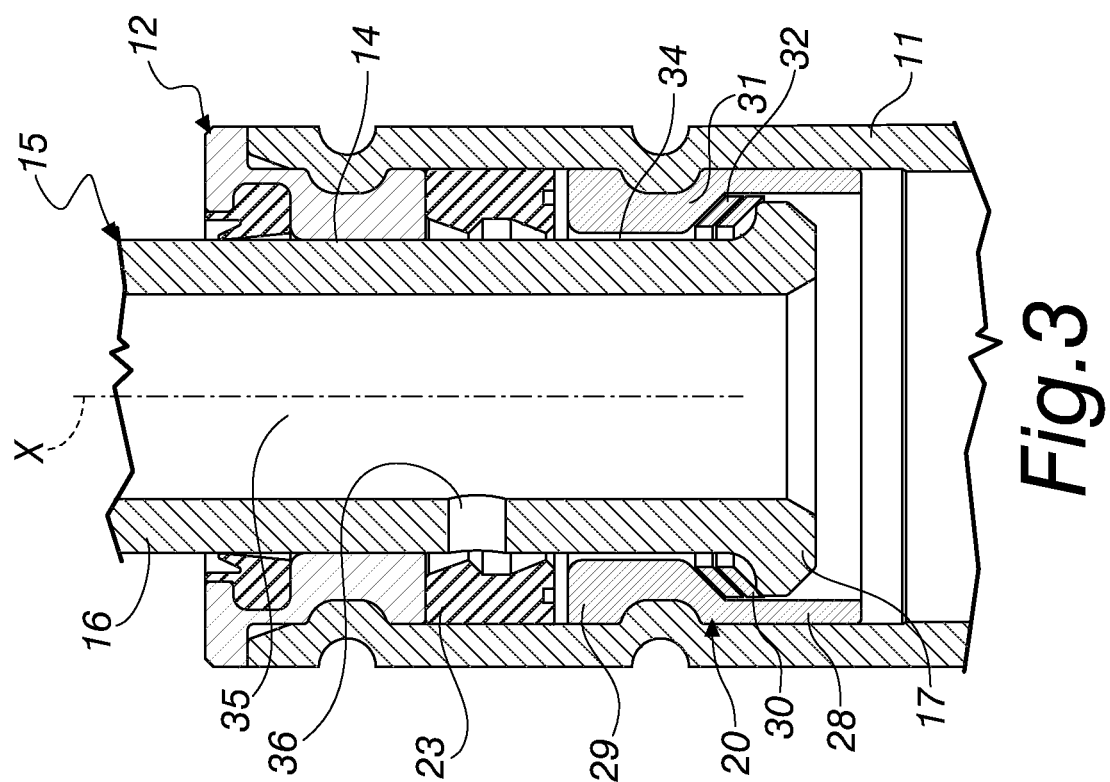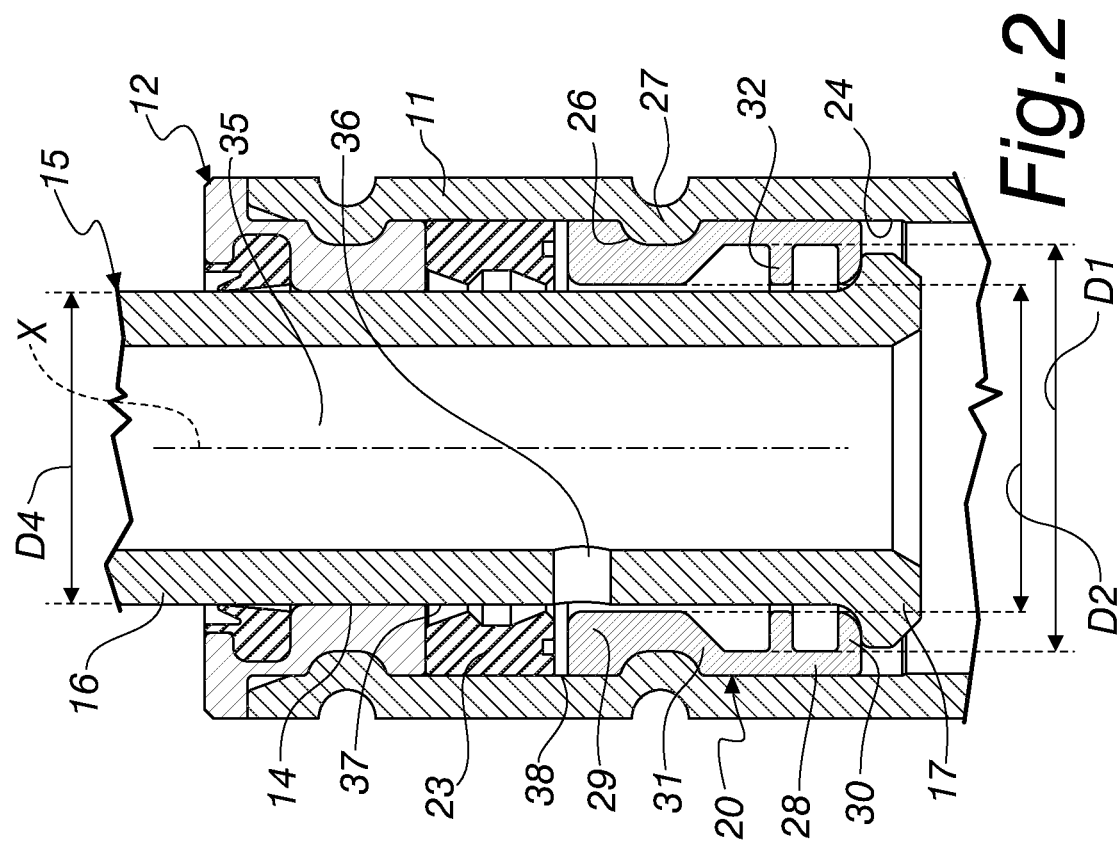

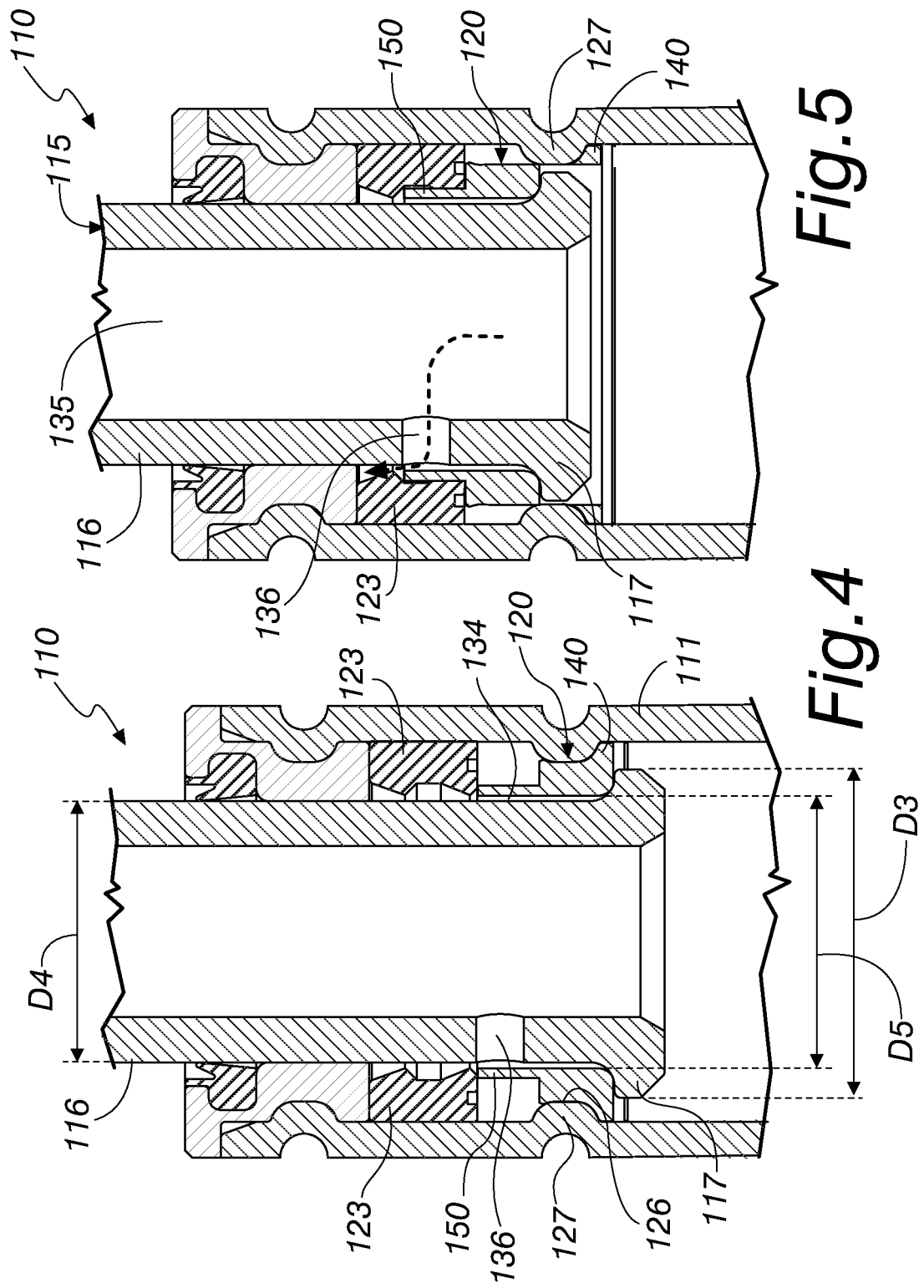

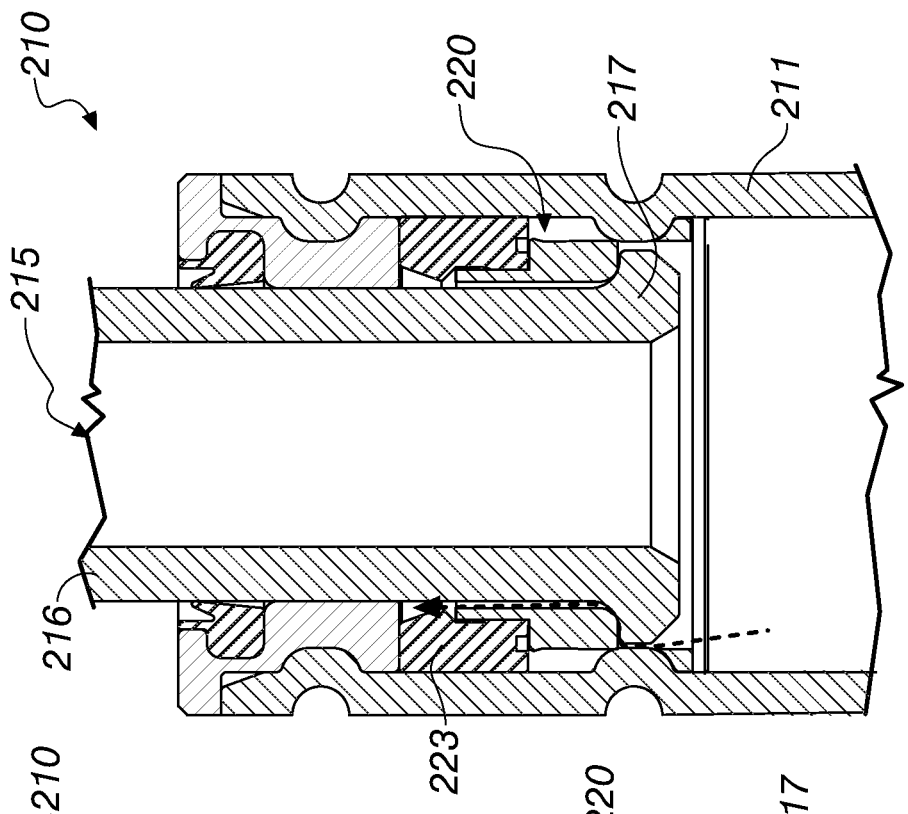
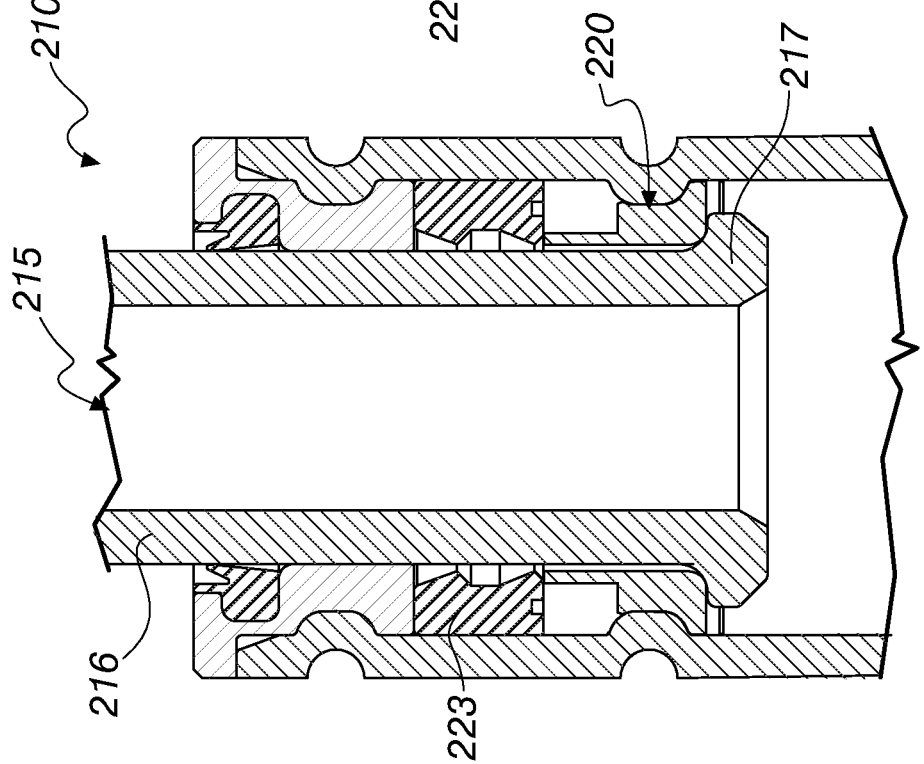

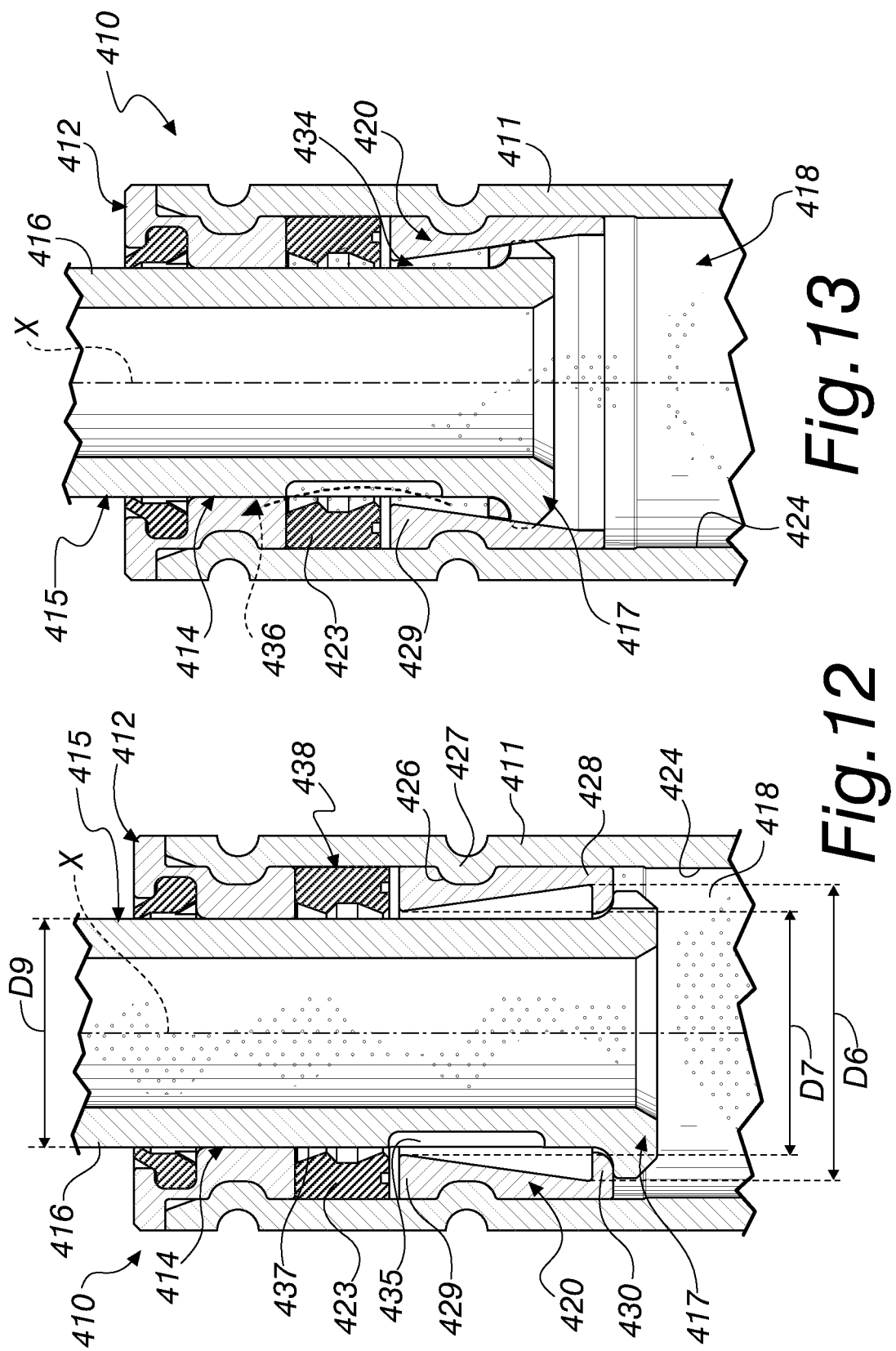

GAS CYLINDER ACTUATOR WITH SAFETY DEVICE FOR UNCONTROLLED RETURN OF THE PISTON-STEM

The present invention relates to a gas cylinder actuator with safety device for uncontrolled return of the piston-stem.

Gas cylinder actuators generally are defined by a tubular gas containment jacket, which is closed hermetically at one end by a first head, with a hole for the passage of a stem with piston and configured to define a guide for the translation of this stem inside the jacket, and at the other end by a second head, provided with a gas charging valve; the jacket and the two heads define the travel space for the piston, while the piston proper, with the jacket and the second head, defines the chamber for the pressurized gas.

Such gas cylinder actuators are typically, but not exclusively, used in situations, such as in the use of mold dies, mold presses, and the like, in which they are subjected to conditions of use such that they are susceptible of being damaged; such damage can render the gas cylinder actuator unusable, making replacement necessary and entailing the shutdown of the machine or plant in which it is deployed to operate, and such damage can also be such as to cause harm to an operator who happens to be in the vicinity, such as in the event of a breakage caused by overpressure, or in the event of ejection of the stem owing to breakage and separation from the piston, caused by an unforeseen and uncontrolled return push due to pressurized gas, i.e. the phenomenon known as 'uncontrolled return'.

Experience teaches that the most critical condition arises when a mold, on which a gas cylinder actuator acts, jams with the gas cylinder actuators in the compression state, and then that mold suddenly unjams, resulting in an extremely rapid return of the piston-stem, hence with extremely high kinetic energy, such as to cause, as a result of impact, the breakage of either the perforated head that holds the piston-stem in the jacket, or of the piston-stem.

In both cases there is the very high risk that the stem will be ejected with force, with great danger for anyone who may be in the vicinity.

In order to overcome such drawback, today various means and devices are known for overcoming the phenomenon of uncontrolled return of the piston-stem.

A first type of such devices entails the presence of an auxiliary extraction-preventing abutment shoulder, defined on the stem proximate to the piston, so that if there is a break between the piston and the stem in the joining region between the two, then the stem will be held inside the jacket by virtue of the abutment of such auxiliary shoulder against a corresponding abutment shoulder provided on the perforated second head of the gas cylinder actuator.

A second type of safety device for handling a situation of uncontrolled return of the piston-stem entails that a preset part of the piston or of the stem will break off following an impact of predefined force, and that such part will cause damage to the sealing gasket of the piston or of the stem, thus allowing the discharge outside of the pressurized gas and thus preventing the violent and uncontrolled ejection of that stem.

However, events may occur for which predefined breakages of the types described above are not sufficient to ensure a sufficiently rapid discharge of the pressurized gas to prevent the gas cylinder actuator from collapsing at other points in addition to the ones foreseen, nor are they sufficient to prevent the piston-stem from being ejected.

The aim of the present invention is to provide a gas cylinder actuator with safety device for uncontrolled return of the piston-stem which is capable of overcoming the limitations of the gas cylinder actuators known today with similar safety devices.

Within this aim, an object of the invention is to provide a gas cylinder actuator in which the kinetic energy of the piston-stem is dissipated under conditions of uncontrolled return, without this energy resulting in the breakage of the structure proper of the gas cylinder actuator.

Another object of the invention is to provide a gas cylinder actuator that ensures the exit in safety of the pressurized gas without the piston-stem breaking in the event of an uncontrolled return situation.

Another object of the invention is to provide a gas cylinder actuator in which, in the event of uncontrolled return, the uncontrolled ejection does not occur of the piston-stem or of another part of the spring proper.

A still further object of the invention is to provide a gas cylinder actuator that offers performance levels that are not less than those of similar conventional gas cylinder actuators.

This aim and these and other objects which will become better apparent hereinafter are achieved by a gas cylinder actuator with safety device for uncontrolled return of the piston-stem according to claim 1, optionally provided with one or more of the characteristics of the dependent claims.

Further characteristics and advantages of the invention will become better apparent from the description of five preferred, but not exclusive, embodiments of the gas cylinder actuator according to the invention, which are illustrated by way of non-limiting example in the accompanying drawings wherein:

FIG. 2 is a detail of the gas cylinder actuator in FIG. 1 in a first operating configuration;

FIG. 3 is the same view as FIG. 2 in a second operating configuration;

FIG. 4 is a cross-sectional side view, taken along a diametrical plane, of a gas cylinder actuator according to the invention in a second embodiment thereof, in a first operating configuration;

FIG. 5 is the same view as FIG. 4 in a second operating configuration;

FIG. 6 is a cross-sectional side view, taken along a diametrical plane, of a gas cylinder actuator according to the invention in a third embodiment thereof, in a first operating configuration;

FIG. 7 is the same view as FIG. 6 in a second operating configuration;

FIG. 12 is a detail of the gas cylinder actuator in FIG. 11 in a first operating configuration;

FIG. 13 is the same view as FIG. 12 in a second operating configuration.

Figure 1:
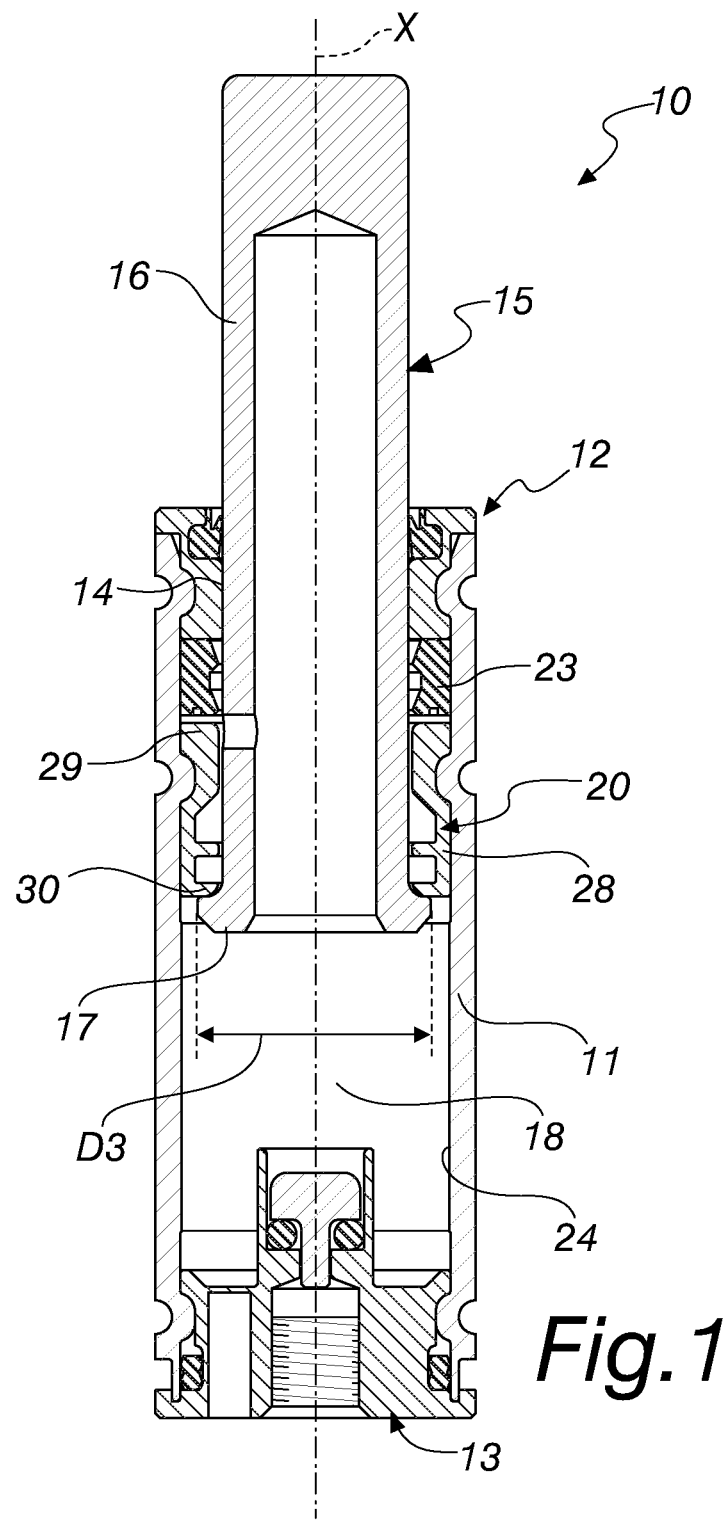
FIG. 1 is a cross-sectional side view, taken along a diametrical plane, of a gas cylinder actuator according to the invention in a first embodiment thereof.

With reference to the figures, a gas cylinder actuator with safety device for uncontrolled return of the piston-stem according to the invention is generally designated, in a first embodiment thereof, with the reference numeral 10.

Such gas cylinder actuator with safety device for uncontrolled return of the piston-stem comprises:

- a tubular containment jacket 11, cylindrical,
- two opposing heads 12 and 13, each one constituted by a corresponding solid of revolution, for closing the tubular jacket 11, a first head 12 which is provided with a through hole 14 for passage and for translation guidance with respect to an axis X for a piston-stem 15, and a second, opposing head 13,
- a piston-stem 15, which comprises a stem portion 16, cylindrical, and a piston portion 17, annular;
- sealing means 23 which are arranged so as to act against the stem portion 16 at the passage and guidance hole 14,
- between the tubular jacket 11, the heads 12 and 13 and the piston-stem 15 there being a chamber for pressurized gas 18.

The through hole 14 has a size such that no play is present between the hole 14 and the stem portion 16; for this reason it is a guidance hole for the stem 16.

The peculiarity of the gas cylinder actuator 10 consists in that it comprises, between the first head 12 and the piston portion 17, a bushing 20, which is coupled to the tubular jacket 11 with means of preventing translation with respect to the axis X, and is designed to encounter the piston portion 17.

Such bushing 20 is configured to at least be deformed in the event of impact with the piston portion 17 owing to the uncontrolled return of the piston-stem 15, so as to allow the passage of that piston portion 17 and the formation of a gas discharge passage between the piston-stem 15, the sealing means 23 and the passage and guidance hole 14.

In the first embodiment, in FIGS. 1 to 3, such bushing 20 is contoured to be in contact at least partially with the internal surface 24 of the jacket 11.

The means of preventing translation with respect to the axis X are constituted, for example, by an external annular recess 26 which is defined outside the bushing 20 and is shaped so as to receive a corresponding internal annular protrusion 27 which is defined inside the jacket 11.

The bushing 20 has a first annular part 28 which has a first inside diameter D1 which is greater than the outside diameter D3, indicated in FIG. 1, of the piston portion 17, and a second annular part 29 which has a second inside diameter D2 which is smaller than the outside diameter D3 of the portion of piston 17.

The second inside diameter D2 of the second part 29 is greater than the diameter D4 of the stem portion 16, and there is a play 34 between such second part 29 and the stem portion 16.

The bushing 20 has a size such that there is a play between the stem portion 16 and all of the bushing 20.

The bushing 20 has, at the end of the first part 28, a first internal radial protrusion 30, which extends toward the axis of symmetry X and is designed to absorb the impact with the piston portion 17, either by deforming so as to allow the piston portion 17 to pass, or by breaking and separating from the remainder of the bushing 20, as shown for example in FIG. 3.

Between the first radial protrusion 30 and an intermediate annular part 31 thereof, for connection between the first annular part 28 and the second annular part 29, the bushing 20 has at least one second internal radial protrusion 32, for example one, as in FIGS. 1 to 3, which is designed to absorb the impact with the piston portion 17, either by deforming so as to allow the piston portion 17 to pass, or by breaking and separating from the remainder of the bushing 20, as shown for example in FIG. 3.

The piston-stem 15 is provided with an axial recess 35 and a radial hole 36, which are adapted to allow the discharge of the pressurized gas between the stem portion 16 and the sealing means 23 when the radial hole 36 is facing, entirely or at least partially, the sealing means 23 proper as in FIG. 3.

The sealing means 23 are constituted, for example, by an annular gasket which is pressed in a radial direction with respect to the axis X between the outer surface 37 of the stem portion 16 and the facing portion of the internal surface 38 of the jacket 11.

The radial hole 36 is defined on the piston-stem 15 in such a position that, during the normal operation of the gas cylinder actuator 10, it will not be facing, even partially, toward the sealing means 23, while in the event of uncontrolled return, by virtue of the deformation or of the breakage of one or more of the internal radial protrusions 30 and 32, such radial hole 36 will be facing, partially or totally, toward the sealing means 23, thus allowing the discharge of the pressurized gas.

In a second embodiment of the gas cylinder actuator according to the invention, shown in FIGS. 4 and 5 and designated therein with the reference numeral 110, similarly to what is described above for the first embodiment, the means of preventing translation with respect to the axis X are constituted by an external annular recess 126 which is defined outside the bushing 120 and is shaped so as to receive a corresponding internal annular protrusion 127 which is defined inside the jacket 111.

The bushing 120 has a single inside diameter D5 which is smaller than the outside diameter D3 of the piston portion 117; such single inside diameter D5 is greater than the diameter D4 of the stem portion 116, and there is a play 134 between the bushing 120 and the stem portion 116.

The bushing 120 has a size such that there is a play between the stem portion 116 and all of the bushing 120.

The bushing 120 has, at the external annular recess 126, an external radial protrusion 140, which is designed to absorb the impact of the bushing 120 with the piston portion 117, either by deforming so as to allow the bushing to move together with the piston portion 117, or by breaking and separating from the remainder of the bushing 120 as shown for example in FIG. 5.

The external radial protrusion 140 is, for example, annular.

In such second embodiment, the bushing 120 has an axial protrusion 150 which is configured to damage the sealing means 123, i.e. an annular gasket as already described above for the first embodiment, when the bushing 120 is pushed outward in the direction of the axis X by the piston portion 117 in the event of uncontrolled return.

Such axial protrusion 150 is constituted, for example, by a collar with a smaller transverse cross-section than the rest of the body of the bushing 120.

Also in such second embodiment, the piston-stem 115 is provided with an axial recess 135 and a radial hole 136, which are adapted to allow the discharge of the pressurized gas between the stem portion 116 and the sealing means 123 when the radial hole 136 is facing, entirely or at least partially, the sealing means 123 proper as in FIG. 5.

In a third embodiment, shown in FIGS. 6 and 7 and designated therein with the reference numeral 210, the bushing 220 corresponds to what is described above for the bushing 120 of the second embodiment, while the stem portion 216 is constituted by a cylindrical body which is continuous, i.e., which does not have a radial hole.

In such third embodiment, in the event of uncontrolled return, the pressurized gas exits by passing between the piston portion 217 and the jacket 211 and then between the bushing 220, the sealing means 223 and the stem portion 216, and thus outside, instead of passing from inside the piston-stem as in the first and second embodiments described above.

Figure 8:
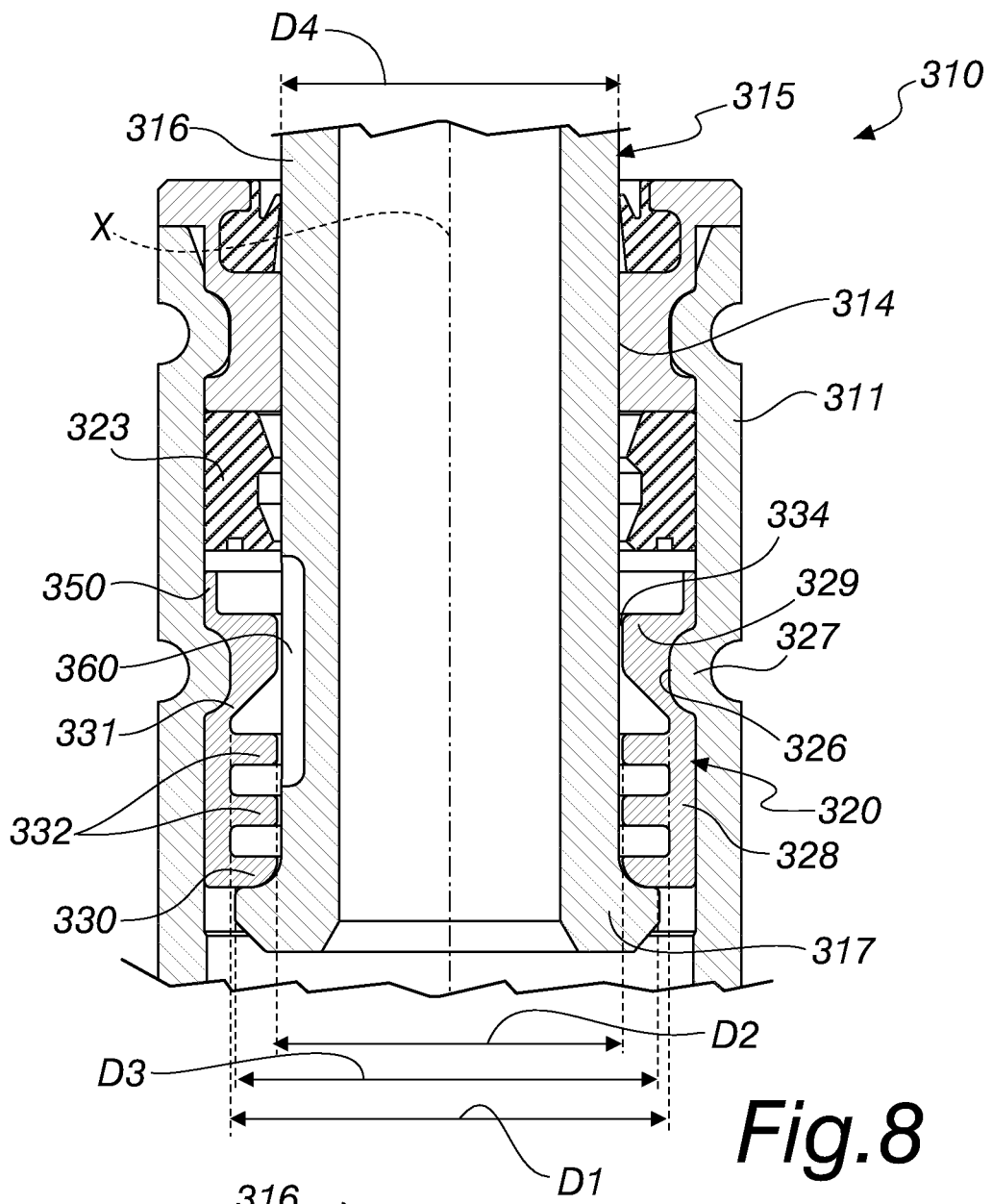
FIG. 8 is a cross-sectional side view, taken along a diametrical plane, of a gas cylinder actuator according to the invention in a fourth embodiment thereof, in a first operating configuration.
Figure 9:
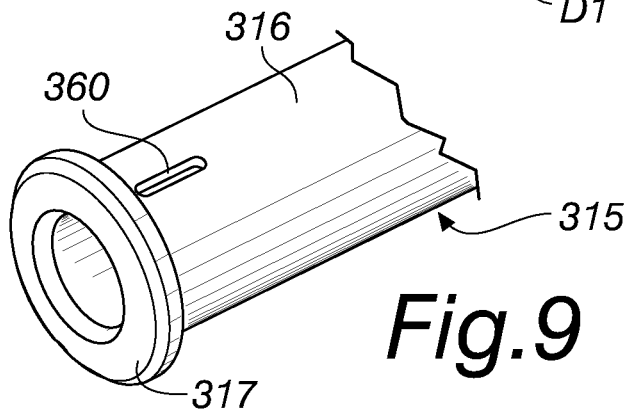
FIG. 9 is a perspective view of a detail of the fourth embodiment.
Figure 10:
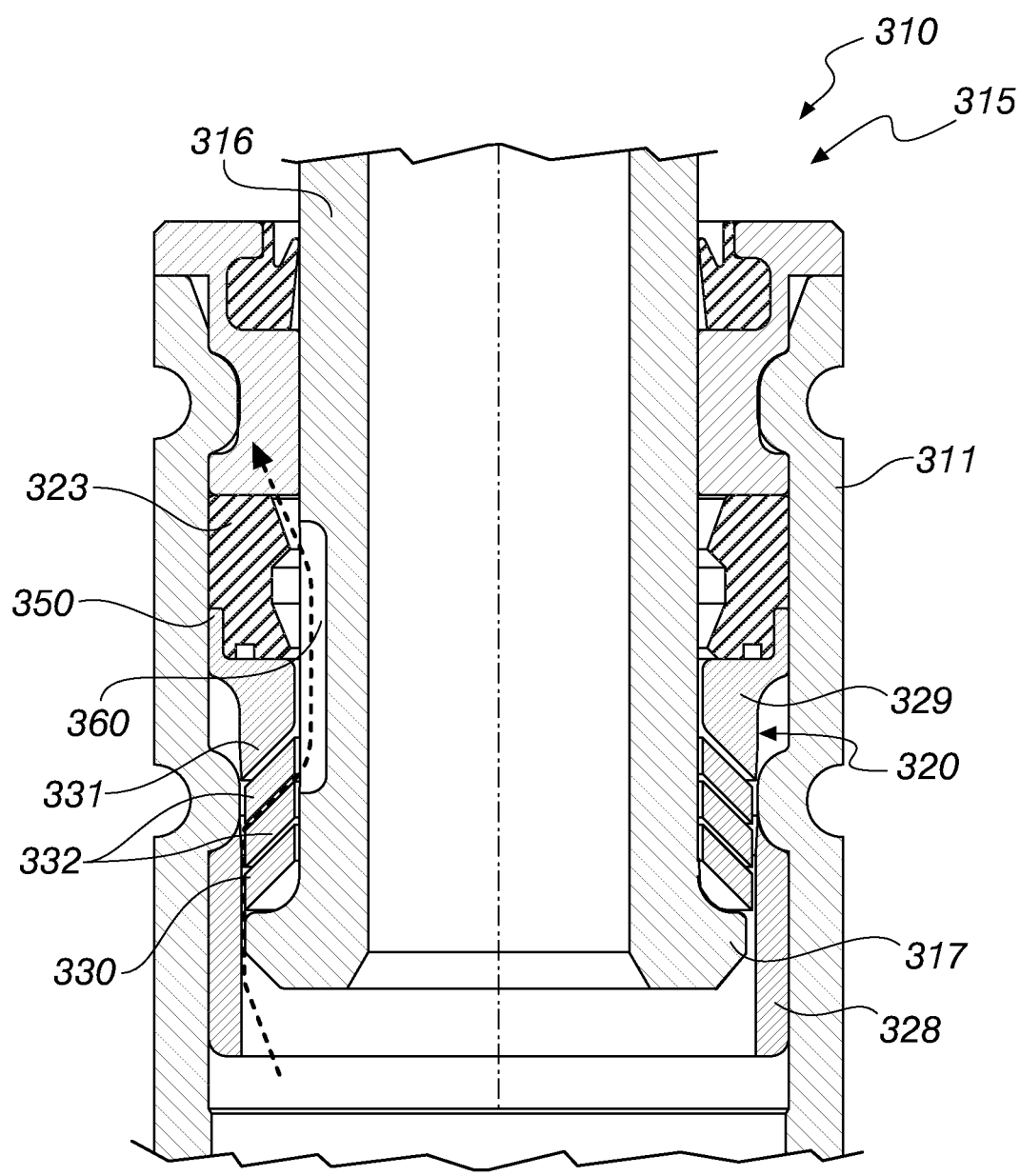
FIG. 10 is the same view as FIG. 8 in a second operating configuration.

In a fourth embodiment, shown in FIGS. 8, 9 and 10 and designated therein with the reference numeral 310, the bushing 320 has a first annular part 328 which has a first inside diameter D1 which is greater than the outside diameter D3 of the piston portion 317, and a second annular part 329 which has a second inside diameter D2 which is smaller than the outside diameter D3 of the portion of piston 317.

The second inside diameter D2 of the second part 329 is greater than the diameter D4 of the stem portion 316, and there is a play 334 between such second part 329 and the stem portion 316.

The bushing 320 has a size such that there is a play between the stem portion 316 and all of the bushing 320.

The bushing 320 has, at the end of the first part 328, a first internal radial protrusion 330, which extends toward the axis of symmetry X and is designed to absorb the impact with the piston portion 317, either by deforming so as to allow the piston portion 317 to pass, or by breaking and separating from the remainder of the bushing 320, as shown for example in FIG. 10.

Between the first radial protrusion 330 and an intermediate annular part 331 thereof, for connection between the first annular 328 and the second annular part 329, the bushing 320 has at least one second internal radial protrusion 332, for example two second internal radial protrusions 332 as in FIGS. 8 and 10, which is designed to absorb the impact with the piston portion 317, either by deforming so as to allow the piston portion 317 to pass, or by breaking and separating from the remainder of the bushing 320 as shown for example in FIG. 10.

The intermediate annular part 331 is also configured to deform or break and absorb the impact with a second internal radial protrusion 332, which in turn has been broken off by the impact with the piston portion 317.

The means of preventing translation with respect to the axis X are constituted, for example, by an external annular recess 326 which is defined outside the bushing 320 and is shaped so as to receive a corresponding internal annular protrusion 327 which is defined inside the jacket 311.

The intermediate annular part 331 is defined proximate to the external annular recess 326.

In such fourth embodiment, the bushing 320 also has an axial protrusion 350 which is configured to position the bushing 320 during assembly and optionally, after an uncontrolled return, to damage the sealing means 323, i.e. an annular gasket as already described above for the first embodiment, when the bushing 320 is pushed outward in the direction of the axis X by the piston portion 317 in the event of uncontrolled return.

Such axial protrusion 350 is constituted, for example, by a collar with a smaller transverse cross-section than the rest of the body of the bushing 320.

In such fourth embodiment, the piston-stem 315 has, on the outer surface of the stem portion 316, a longitudinal recess 360, which extends in an axial direction for a length such as to allow the discharge of the pressurized gas between the stem portion 316 and the sealing means 323 when the longitudinal recess 360 is partly facing the bushing 320 and is partly facing the sealing means 323, as in FIG. 10.

Such longitudinal recess 360 is provided, for example, by milling.

In such fourth embodiment the bushing 320 comprises, as well as internal radial protrusions 330 and 332, an additional portion configured to deform or break so as to dissipate the energy arising from the impact with the piston-stem 315, i.e. the intermediate annular part 331; its deformation and/or breakage contributes to reducing the remaining kinetic energy of the piston-stem 315.

Figure 11:
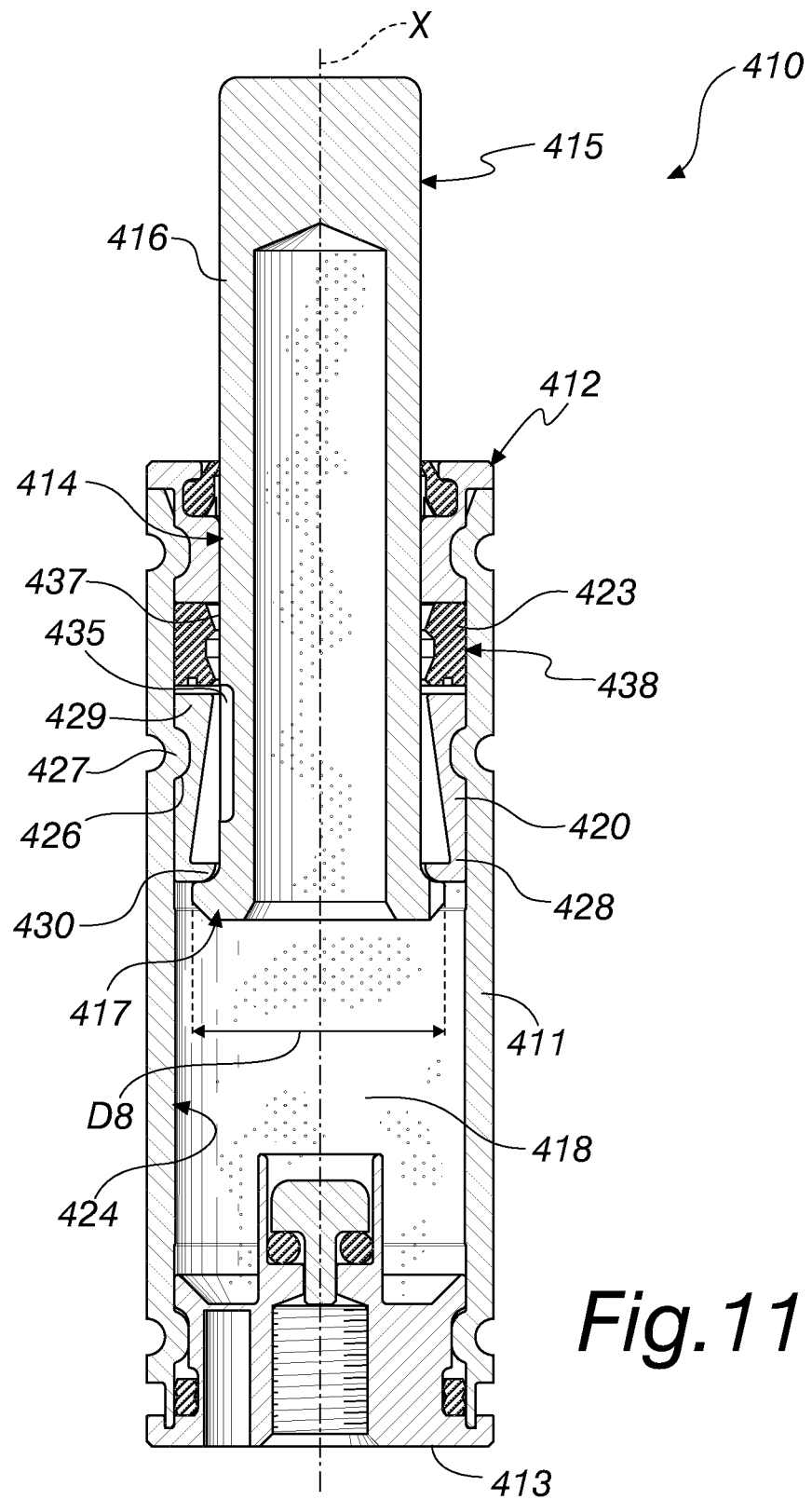
FIG. 11 is a cross-sectional side view, taken along a diametrical plane, of a gas cylinder actuator according to the invention in a fifth embodiment thereof.

A fifth embodiment is shown in FIGS. 11, 12 and 13 and designated therein with the reference numeral 410.

Such structure 410 comprises: a tubular containment jacket, 411, cylindrical; two opposing heads 412 and 413, each one constituted by a corresponding solid of revolution, for closing the tubular jacket 411; a first head 412 which is provided with a through hole 414 for passage and for translation guidance with respect to an axis X for a piston-stem 415; and a second, opposing head 413; a piston-stem 415, which comprises a stem portion 416, cylindrical, and a piston portion 417, annular; sealing means 423 which are arranged so as to act against the stem portion 416 at the passage and guidance hole 414.

The through hole 414 has a size such that no play is present between the hole 414 and the stem portion 416; for this reason it is a guidance hole for the stem 416.

Between the tubular jacket 411, the heads 412 and 413 and the piston-stem 415 there is a chamber for pressurized gas 418.

Between the first head 412 and the piston portion 417 there is a bushing 420, which is coupled to the tubular jacket 411 with means of preventing translation with respect to the axis X, and is designed to encounter the piston portion 417.

Such bushing 420 is configured to at least be deformed in the event of impact with the piston portion 417 owing to the uncontrolled return of the piston-stem 415, so as to allow the passage of that piston portion 417 and the formation of a gas discharge passage between the piston-stem 415, the sealing means 423 and the passage and guidance hole 414.

Such bushing 420 is contoured to be in contact at least partially with the internal surface 424 of the jacket 411.

The means of preventing translation with respect to the axis X are constituted, for example, by an external annular recess 426 which is defined outside the bushing 420 and is shaped so as to receive a corresponding internal annular protrusion 427 which is defined inside the jacket 411.

The bushing 420, in FIG. 12, has a conical internal profile which has a first part with a first inside diameter D6 which is greater than the outside diameter D8, indicated in FIG. 11, of the piston portion 417, and a second part 429 with an inside diameter D7 which is smaller than the outside diameter D8 of the portion of piston 417.

The second inside diameter D7 of the second part 429 is greater than the diameter D9 of the stem portion 416, and there is a play 434 between such second part 429 and the stem portion 416, as in FIG. 13.

The bushing 420 has a size such that there is a play between the stem portion 416 and all of the bushing 420.

The bushing 420 has, at the end of the first part 428, an internal radial protrusion 430, which extends toward the axis of symmetry X and is designed to absorb the impact with the piston portion 417, either by deforming so as to allow the piston portion 417 to pass, or by breaking and separating from the remainder of the bushing 420, as shown for example in FIG. 13.

The conical internal profile of the bushing 420 with an inside diameter becoming progressively smaller between D6 and D7 determines a wedging of the piston portion 417 between the rest of the bushing 420 and the stem 416.

The piston-stem 415 is provided with a longitudinal recess 435 which is adapted to allow the discharge of the pressurized gas between the stem portion 416 and the sealing means 423 when the recess 435 is facing, entirely or at least partially, the sealing means 423 proper as in FIG. 13.

The sealing means 423 are constituted, for example, by an annular gasket which is pressed in a radial direction with respect to the axis X between the outer surface 437 of the stem portion 416 and the facing portion of the internal surface 438 of the jacket 411.

The recess 435 is provided, for example, by way of milling.

The recess 435 is defined on the piston-stem 415 in such a position that, during the normal operation of the gas cylinder actuator 410, it will not be facing, even partially, toward the sealing means 423, while in the event of uncontrolled return, by virtue of the deformation or of the breakage of the internal radial protrusions 430, such recess 435 will be facing, partially or totally, toward the sealing means 423, thus allowing the discharge of the pressurized gas in the direction indicated by the arrow 436 in FIG. 13.

With such gas cylinder actuator according to the invention 10, 110, 210, 310 and 410 the safety is provided by inserting, between the piston and the guiding element of the stem, an additional element, i.e. the bushing.

Following an uncontrolled return of the piston-stem, the at least deformable portions of the bushing will deform, up to and including breaking point, and will absorb the kinetic energy of the piston-stem.

In practice it has been found that the invention fully achieves the intended aim and objects.

In particular, with the invention a gas cylinder actuator has been devised that ensures the exit in safety of the pressurized gas without the piston-stem, or other structural elements of the gas cylinder actuator such as the jacket or heads, breaking in the event of an uncontrolled return situation.

Furthermore, with the invention a gas cylinder actuator has been devised in which a possible overpressure in the compression and expansion chamber will never result in the uncontrolled ejection of the piston-stem.

Also, with the invention a gas cylinder actuator has been devised that offers performance levels that are not inferior to those of similar conventional gas cylinder actuators.

The invention, thus conceived, is susceptible of numerous modifications and variations, all of which are within the scope of the appended claims. Moreover, all the details may be substituted by other, technically equivalent elements.

In practice the components and the materials employed, provided they are compatible with the specific use, and the contingent dimensions and shapes, may be any according to requirements and to the state of the art.

The disclosures in Italian Patent Applications No. 102017000018002 (UA2017A001018) and No. 102017000051549 (UA2017A003362) from which this application claims priority are incorporated herein by reference.

What is claimed is:

1. A gas cylinder actuator with safety device for uncontrolled return of the piston-stem, which comprises:
a tubular containment jacket,
two opposing heads for closing said tubular jacket, a first head which is provided with a through hole for passage and for translation guidance with respect to an axis of symmetry for a piston-stem, and a second, opposing head,
the piston-stem, which comprises a stem portion and a piston portion,
sealing means which are arranged so as to act against said stem portion at said through hole, wherein the sealing means are constituted by an annular gasket which is pressed between an outer surface of the stem portion and a facing portion of an internal surface of the jacket,
a chamber for pressurized gas being defined between said tubular jacket, said heads and said piston-stem, wherein said piston portion of the piston-stem is movably positioned within the chamber,
said gas cylinder actuator further comprising, between said first head and said piston portion, a bushing, which is coupled to said tubular jacket with means of preventing translation with respect to said axis, and is designed to encounter said piston portion, said bushing being configured to at least be deformed in the event of impact with said piston portion owing to the uncontrolled return of said piston-stem, so as to allow the passage of said piston portion and the formation of a gas discharge passage between the piston-stem, the sealing means and the through hole, said bushing positioned between said sealing means and said piston portion of said piston-stem, and wherein said bushing comprises a first internal radial protrusion that extends radially from said bushing towards said axis and contacting said piston-stem, wherein the first internal radial protrusion is designed to absorb the impact of the bushing with the piston portion, either by deforming so as to allow the bushing to move together with the piston portion, or by breaking and separating from the remainder of the bushing.

2. The gas cylinder actuator according to claim 1, wherein said means of preventing translation with respect to said axis are constituted by an external annular recess which is defined outside the bushing and is shaped so as to receive a corresponding internal annular protrusion which is defined inside the jacket.

3. The gas cylinder actuator according to claim 1, wherein said bushing has a first part which has a first inside diameter which is greater than the outside diameter of the piston portion, and a second part which has a second inside diameter which is smaller than the outside diameter of the piston portion.

4. The gas cylinder actuator according to claim 3, wherein said bushing has a conical internal profile between said first part and said second part.

5. The gas cylinder actuator according to claim 3, wherein the second inside diameter of the second part is greater than a diameter of the stem portion, and there is a play between said second part and the stem portion.

6. The gas cylinder actuator according to claim 3, wherein said first internal radial protrusion is designed to absorb the impact with the piston portion, either by deforming so as to allow the piston portion to pass or by breaking and separating from the remainder of the bushing.

7. The gas cylinder actuator according to claim 6, wherein between said first internal radial protrusion and an intermediate part thereof, for connection between the first part and the second part, the bushing has at least one second internal radial protrusion, which is designed to absorb the impact with the piston portion, either by deforming so as to allow the piston portion to pass or by breaking and separating from the remainder of the bushing.

8. The gas cylinder actuator according to claim 1, wherein said piston-stem is provided with an axial recess and a radial hole, which are adapted to allow the discharge of the pressurized gas between the stem portion and the sealing means when the radial hole is facing, entirely or at least partially, said sealing means.

9. The gas cylinder actuator according to claim 1, wherein said bushing has an axial protrusion which is configured to damage the sealing means when the bushing is pushed outward in the direction of the axis by the piston portion in the event of uncontrolled return.

10. The gas cylinder actuator according to claim 1, wherein said stem portion is constituted by a cylindrical body that does not have a radial hole.

11. The gas cylinder actuator according to claim 1, wherein the piston-stem has, on an outer surface of the stem portion, a longitudinal recess, which extends in an axial direction for a length such as to allow a discharge of the pressurized gas between the stem portion and the sealing means when the longitudinal recess is partly facing the bushing and is partly facing said sealing means.

12. The gas cylinder actuator according to claim 1, wherein the kinetic energy of the piston-stem is dissipated predominantly by friction between the piston and the conical surface of said bushing.

13. The gas cylinder actuator according to claim 1, wherein said piston portion has a larger diameter than said stem portion.

* * * * *